United States Patent
Garcia

(10) Patent No.: US 9,538,369 B2
(45) Date of Patent: Jan. 3, 2017

(54) ALLOCATION OF PHYSICAL CELL IDENTIFICATION

(71) Applicant: Nokia Solutions and Networks Oy, Espoo (FI)

(72) Inventor: Ian Dexter Garcia, Palatine, IL (US)

(73) Assignee: Nokia Solutions and Networks Oy, Espoo (FI)

( * ) Notice: Subject to any disclaimer, the term of this patent is extended or adjusted under 35 U.S.C. 154(b) by 0 days.

(21) Appl. No.: 14/649,271

(22) PCT Filed: Dec. 4, 2012

(86) PCT No.: PCT/EP2012/074352
§ 371 (c)(1),
(2) Date: Jun. 3, 2015

(87) PCT Pub. No.: WO2014/086397
PCT Pub. Date: Jun. 12, 2014

(65) Prior Publication Data
US 2015/0319611 A1 Nov. 5, 2015

(51) Int. Cl.
*H04W 8/26* (2009.01)
*H04W 16/18* (2009.01)

(52) U.S. Cl.
CPC ............... *H04W 8/26* (2013.01); *H04W 16/18* (2013.01)

(58) Field of Classification Search
CPC ................................ H04W 8/26; H04W 16/18
USPC ........................................................ 370/329
See application file for complete search history.

(56) References Cited

U.S. PATENT DOCUMENTS

2011/0274097 A1  11/2011  Zhang et al. ................. 370/338

FOREIGN PATENT DOCUMENTS

| CN | 102781008 A | 11/2012 |
| JP | 2013/021450 A | 1/2013 |

OTHER PUBLICATIONS

Amirijoo, Mehdi, et al., "Neighbor Cell Relation List and Physical Cell Identity Self-Organization in LTE", ICC Workshops 2008, Communications Workshops, IEEE International Conference, Piscataway, New Jersey, US, May 19, 2008, 5 pgs.

*Primary Examiner* — Ronald B Abelson
(74) *Attorney, Agent, or Firm* — Harrington & Smith

(57) ABSTRACT

A method includes generating, by a network element, a radio map of a single-frequency network having multiple cells. The radio map represents power levels of radio signals at several locations in the network. A first function is selected to be applied, wherein the first function is based on the radio map and includes physical cell identity, PCI, modulo 3 values for the multiple cells as input. Different combinations of the PCI modulo 3 values are applied in the first function. Each candidate PCI modulo 3 value is selected from a group of three available options. An output of the first function is determined with respect to each combination. It is determined which combination provides the output fulfilling a predefined criterion. Those PCI modulo 3 values, which correspond to the output fulfilling the predefined criterion, are allocated to the multiple cells in order to reduce interference between primary synchronization sequences.

27 Claims, 4 Drawing Sheets

ALLOCATION OF PHYSICAL CELL IDENTIFICATION

FIELD

The invention relates generally to mobile communication networks. More particularly, the invention relates to allocation of physical cell identities (PCI).

BACKGROUND

In the LTE air interface, a physical (-layer) cell identity (PCI) is used for cell identification and for channel synchronization. Thus, the PCI planning may affect the performance of the network, especially in a scenario with overlapping cells. For example, from the point of view of an operator, it may be very important to perform the PCI planning as optimally as possible in order to provide an efficient and a customer-friendly communication network.

BRIEF DESCRIPTION OF THE INVENTION

According to an aspect of the invention, there is provided a method as specified in claim 1.

According to an aspect of the invention, there are provided apparatuses as specified in claims 16 and 31.

According to an aspect of the invention, there is provided a computer program product as specified in claim 32.

According to an aspect of the invention, there is provided a computer-readable distribution medium carrying the above-mentioned computer program product.

According to an aspect of the invention, there is provided an apparatus comprising processing means configured to cause the apparatus to perform any of the embodiments as described in the appended claims.

According to an aspect of the invention, there is provided an apparatus comprising a processing system configured to cause the apparatus to perform any of the embodiments as described in the appended claims.

According to an aspect of the invention, there is provided an apparatus comprising means for performing any of the embodiments as described in the appended claims.

Embodiments of the invention are defined in the dependent claims.

LIST OF DRAWINGS

In the following, the invention will be described in greater detail with reference to the embodiments and the accompanying drawings, in which FIG. 1 presents a communication network according to an embodiment;

DESCRIPTION OF EMBODIMENTS

The following embodiments are exemplary. Although the specification may refer to "an", "one", or "some" embodiment(s) in several locations of the text, this does not necessarily mean that each reference is made to the same embodiment(s), or that a particular feature only applies to a single embodiment. Single features of different embodiments may also be combined to provide other embodiments.

The embodiments of the invention are applicable to a plurality of communication networks regardless of the applied radio access technology. For example, at least one of the following radio access technologies (RATs) may be applied: long term evolution (LTE), and/or LTE-advanced (LTE-A). The present embodiments are not, however, limited to these protocols.

Figure 1:
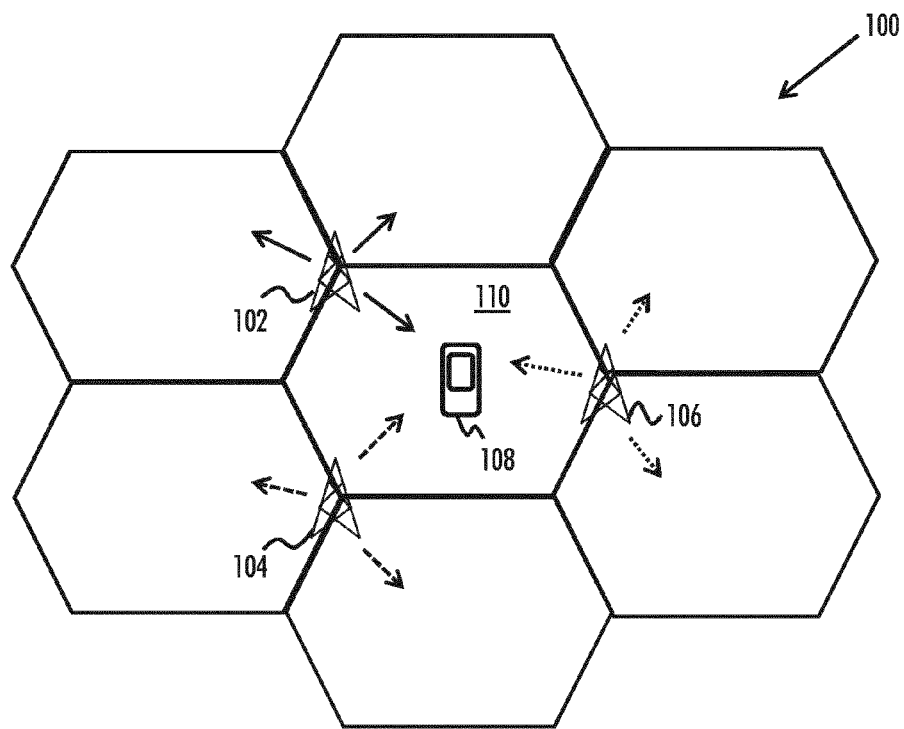

As shown in FIG. 1, a typical cell planning of a network 100 may be based on three-sector sites, such as eNBs 102, 104, 106. This means that each site 102, 104 and 106 provides three cells directed to different directions, as shown in FIG. 1 with solid, dashed and dotted arrows, respectively. However, the network 100 may also comprise two-sector sites and/or omni-directional (single sector) sites (although not shown). Each eNB 102, 104, 106, may be connected via an S1 interface to an evolved packet core (EPC), more specifically to a mobility management entity (MME) and to a system architecture evolution gateway (SAE-GW). The MME is a control plane for controlling functions of non-access stratum signaling, roaming, authentication, tracking area list management, etc., whereas the SAE-GW handles user plane functions including packet routing and forwarding, idle mode packet buffering, a connection to Internet, etc.

Each of the three sectors (e.g. cells, each represented with a hexagonal block in FIG. 1) may have a physical-layer cell identifier (PCI). The determination of the PCI for a cell may be based on two aspects: a physical-layer cell identity group number $N_{ID1}$ {0, 1, ..., 167} and a physical-layer cell identity number $N_{ID2}$ {0, 1, 2}. The PCI may then be determined on the basis of the $N_{ID1}$ and the $N_{ID2}$ as follows:

$$PCI=(3\times N_{ID1})+N_{ID2},$$

which implies 504 possible values. Assuming $N_{ID1}=1$ and the $N_{ID1}=2$ then the PCI for the cell is PCI=3*2+1=7.

The $N_{ID1}$ may define a secondary synchronization sequence (SSS), whereas the $N_{ID2}$ may define a primary synchronization sequence (PSS), corresponding to $1^{st}$, $2^{nd}$, and $3^{rd}$ PSS groups on the basis of PCI modulo 3 (PCI mod 3) arithmetic. Members of the same PCI mod 3 group have the same PCI mod 3 value, i.e. either 0, 1, or 2. Consequently, according the specification of the LTE, cells with the same PCI mod 3 in the single frequency layer network 100 have the same PSS sequence. Further, the cells may have the same time-frequency location of the cell-specific reference signals (CRS).

In addition, a PCI modulo 30 (PCI mod 30) arithmetic may be determined for each PCI candidate. This may be beneficial so that uplink reference signal collisions, such as collisions of physical uplink control channel (PUCCH) demodulation reference signals (DMRS) may be avoided, as will be explained later. Here it may be noted that the PUCCH DMRS sequences may be constructed from Zadoff-Chu sequences which are divided into 30 groups. Roughly, this means that there are 30 different base sequences that may be used as the DMRS. Members of the same PCI mod 30 have the same PCI mod 30 value, i.e. one of {0, 1, ..., 29}. For cells with the same PCI mod 30, the cells may have the same DMRS sequence group number.

Cell synchronization may be the very first step when user equipment 108 wants to camp on a given cell. The user equipment 108 may be e.g. a user terminal (UT), a computer (PC), a laptop, a tabloid computer, a cellular phone, a mobile phone, a communicator, a smart phone, a palm computer, or any other communication apparatus. From the synchronization, the UE 108 acquires the PCI, time slot and frame synchronization, which may enable the UE 108 to obtain system information blocks (SIB) from the network 100. During the synchronization, the UE 108 may first find the PSS. From the PSS, the UE 108 may also be able to obtain the $N_{ID2}$ (e.g. a value from a group {0, 1, 2}). In the next step, the UE 108 may acquire the SSS symbols. From the SSS, the UE 108 may be able to obtain the $N_{ID1}$ (e.g. a value from a group {0, 1, . . . , 167}). Using the $N_{ID1}$ and the $N_{ID2}$, the UE 108 may acquire knowledge of the PCI for the cell. Once the UE knows the PCI for the cell, it may also know the location of the cell-specific reference signals (CRS) used in channel estimation, cell selection/reselection and handover procedures.

From the above it is clear that allocating the PCIs (e.g. allocating the $N_{ID1}$ and the $N_{ID2}$ for the cells) is important from the point of view of the performance of the network 100. For example, looking at FIG. 1, it may be seen that the UE 108 locates in the area 110 in which each of the eNB 102, 104, 106 provides coverage to. In other words, three cells overlap in the area 110 where the UE 108 is located. Let us further assume that at least some of the overlapping cells in the area 110 have the same $N_{ID1}$ and/or $N_{ID2}$. As a result, during synchronization in the network 100, the overlap of the PSSs and/or the SSSs from different eNBs 102, 104, 106 may cause significant degradation in the detection of the eNBs 102, 104, 106. This may lead to poor key performance indicators (KPIs), especially for UEs at the cell-edge.

A conventional approach to avoid such CRS/PSS/SSS/DMRS collisions for three-sector site deployments is to assign a different PCI mod 3 (i.e. different $N_{ID2}$) to cells of the same site. For single-sector deployments, the conventional approach to avoid collisions is by visual inspection. However, in these approaches, the collisions are not optimally avoided.

In order to improve the network performance and the KPIs, an improved solution for the allocation of the PCIs is needed which takes into account radio frequency signal levels in the network 100. Therefore, it is proposed, as shown in step 200 of FIG. 2, to generate, by a network element, a radio map of the single-frequency network 100 having a plurality of cells. Reuse of frequencies may not be an option in case the network 100 is a single-frequency network. Thus, the overlap of cells of the same frequency may be inevitable. The overlapping cells may even be provided by different operators as long as the cells are at the same frequency. The network element may be any apparatus/entity in the network responsible of the allocation of the PCIs to the cells in the network 100. Let us look further at what the radio map may represent and how such radio map may be generated with reference to FIGS. 3 and 4.

Figure 3:
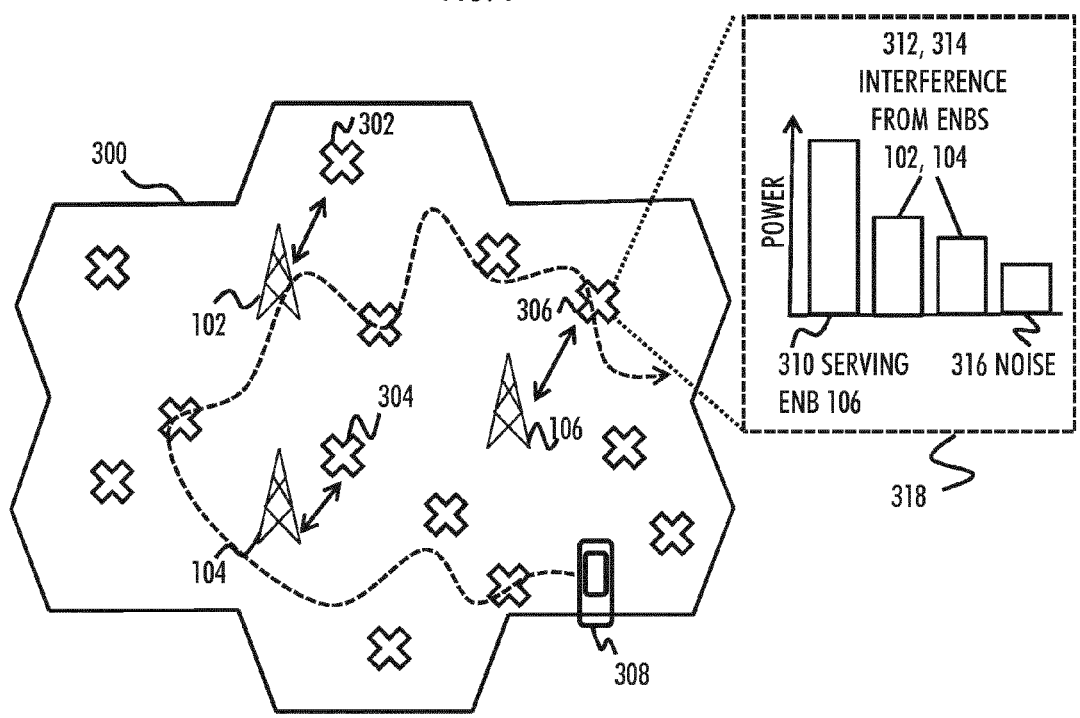
FIG. 3 shows a radio map according to an embodiment.

In an embodiment, the radio map 300 of FIG. 3 may represent power levels of radio signals at several locations in the network 100. The power levels may be, for example, reference signal received power (RSRP) levels and/or received signal level (RSL). The map may thus represent samples of RSRP/RSL levels at different times and/or locations. For each sample, the RSRP/RSL from each detected (or detectable) cell/eNB 102, 104, 106 and the corresponding cell ID are recorded. It may be, for example, that a cell located far away from another cell does not provide any signal coverage to the latter cell. In such case, no signal from the former cell is detected in the latter cell. It should be noted also that instead of the downlink RSRP/RSL, the uplink signal power level may be used. As the RSRP/RSL are detected from as many cells as detected for each sample/location, the radio map may comprise information of inter-cell interference at the several locations in the network 100.

Figure 4:
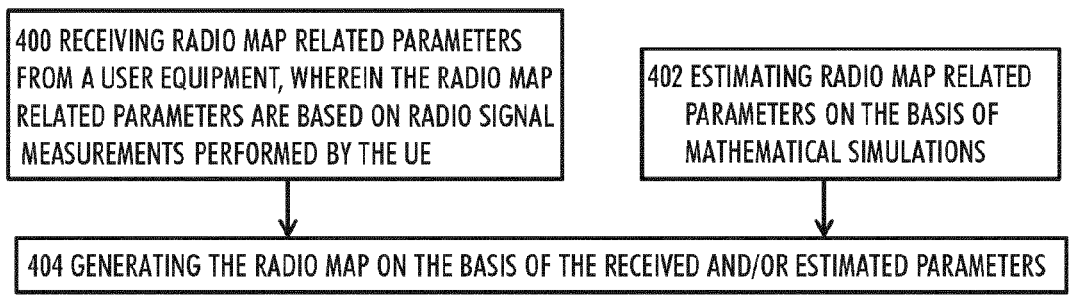

The radio map 300 may be generated on the basis of actual measurements (e.g. measurements from drive test logs of the UE 308 or measurement report logs of the eNB 102, 104, 106). For example, for each of the several locations, marked with crosses in FIG. 3, a power level determination may be performed. In one embodiment, this takes place by the UE 308 travelling around the network 100 and making measurements. As indicated in FIG. 4, according to this embodiment, the network element may in step 400 receive radio map related parameters or parameter values from the UE 308, wherein the radio map related parameters/values are based on radio signal measurements performed by the UE 310. Further, such radio signal level values at different locations may also be obtained by collecting the measurement report radio resource control (RRC) messages sent by several UEs. Thereafter, in step 404, the network element may in step 404 generate the radio map on the basis of the received parameters/values. Further, the network element may receive information indicating identities of the cells providing the radio signals corresponding to the power levels. Further, the network element may receive information indicating the location in network 100 corresponding to the measurement.

In another embodiment, the radio map 300 may be generated on the basis of radio frequency (RF) planning tool and/or simulation predictions instead of or in addition to the actual measurements. The planning tools may comprise, e.g., tools like Atoll (by Forsk) and Planet (by Mentum) which may create predictions through simulations. As indicated in FIG. 4, according to this embodiment, the network element may estimate radio map related parameters or parameter values on the basis of mathematical simulations in step 402 and generate the radio map 300 on the basis of the estimated parameters/values in step 404.

There may be many locations in the network 100. There may even be many locations inside a single cell, as shown with the crosses in FIG. 3. For each of the several locations, in an embodiment, the radio map 300 represents at least one of the following, as shown with the block 318 of FIG. 3: the power level 310 of the radio signal with respect to the serving cell, the power level 312, 314 of interference, noise level 316.

Let us assume that there are three eNBs 102, 104, and 106 and that the eNB 106 provides the best signal quality at the location 306 (i.e. eNB 106 is the serving cell as indicated with solid arrow in FIG. 3). In such case, the radio map 300 may indicate for the location 306 the power level 310 of the desired signal from the eNB 106. Further, it may be detected by the UE 308 in the location 306 that the eNBs 102 and 104 may provide interfering radio signals. The UE 308 or simulations may identify each interference source for each location. Thus, as shown with the block 318, the radio map may further indicate the power level 312 of the interference from the eNB 102 and separately the power level 314 of the interference from the eNB 104. Regarding the interference, it may be noted that the sources of interference in the location 302 may be the eNBs 104 and 106 (assuming the eNB 102 is the serving eNB) and in the location 304 the interfering eNBs may be the eNBs 102 and 106 (assuming the eNB 104, being the closest eNB, is also the serving eNB). It should be noted that in case of several cells, the radio map 300 may represent the individual interference levels with respect to each of the plurality of cells. For the sake of simplicity, the cells are not depicted in FIG. 3, only eNBs 102, 104, 106 are. Further, each location may also be characterized with a detected or predicted noise level 316.

Accordingly, the proposal may enable predicting CRS/PSS/PUCCH DMRS and avoiding collisions by taking into account RF signal level based on drive tests (measurements) or RF planning tool predictions, as will be explained.

Figure 2:
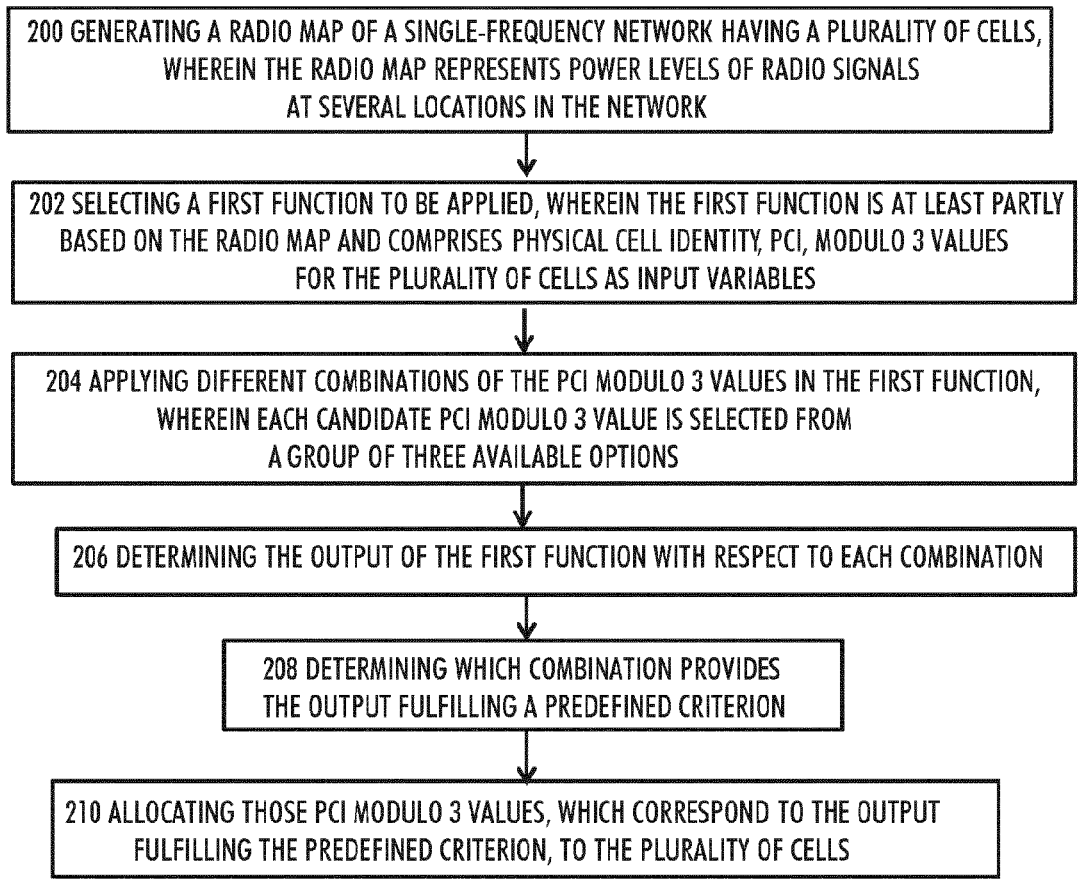
FIGS. 2, 4, 5 and 6 show methods according to some embodiments.

Let us now look at the proposal of FIG. 2 further. In step 202, the network element, e.g. a PCI mod 3 allocation circuitry/module of the network element, selects a first function to be applied, wherein the first function is at least partly based on the radio map and comprises PCI modulo 3 values for the plurality of cells as input variables. There are several options for the first function, as will be described later. The choice of the function to be applied may be arbitrary, or it may depend on the information included in the radio map 300.

In an embodiment, the first function comprises parameters related to interference levels 312, 314 with respect to the plurality of cells in the network 100. Additionally or instead, in an embodiment, the first function comprises parameters related to serving cell signal levels 310. Additionally or instead, in an embodiment, the first function comprises parameters related to noise levels 316 at several locations in the network 100. Additionally or instead, in an embodiment, the first function comprises parameters related to throughput levels with respect to the plurality of cells in the network 100. Each of these parameters may be determined on the basis of the radio map 300 for each of the cells of the network 100 at several locations in the network 100, and possibly for several time instants.

The first function may comprise the PCI mod 3 values for the plurality of cells as input variables. Thus, the output of the first function may depend on what PCI mod 3 values are inputted. In step 204, different combinations of the PCI modulo 3 values may be applied to the first function. As the term modulo 3 refers, each candidate PCI mod 3 value is selected from a group of three available options. In an embodiment, these available options are {0, 1, 2}.

Then, in step 206, the output of the first function with respect to each combination is determined. For example, if the network 100 has nine cells as shown in FIG. 1, each combination comprises nine numbers (each being 0, 1, or 2). I.e. each of the cells is given one possible PCI mod 3 value in one combination. Each combination may be tested and the output may be determined and recorded. It should be noted that the candidate PCI mod 3 values tested for the cells affect the output of the function for example because two cells having different PCI mod 3 values do not interfere each other, for example, from the point of view of the PSS. As the function is based on the radio map and may thus comprise parameters representing power levels of radio signals (both desired signal and the interfering signals), the output of the function may depend on which interference signals are taken into account, as will be described later. In an embodiment, the first function disregards the interference caused to a first cell by a second cell when the first cell and the second cell have different PCI mod 3 values according to the current combination. In other words, the first function takes into account the interference caused to the first cell by the second cell only when the first cell and the second cell have the same PCI mod 3 value according to the current combination.

Step 208 then comprises determining which combination provides the output fulfilling a predefined criterion. In an embodiment, the predefined criterion comprises minimizing or maximizing the output of the first function. Thus, it may be detected which combination of PCI-mod 3 values minimizes the first function, for example. The minimization/maximization of the function (e.g. a cell adjacency metric) may be performed by using an arbitrary global optimization search scheme.

In step 210, those PCI mod 3 values, which correspond to the output fulfilling the predefined criterion, are selected and allocated to the plurality of cells of the network 100. In this manner, optimized PCI mod 3 values (i.e. the $N_{ID2}$ values) are established and allocated to the cells. The optimality of the PCI mod 3 values is due to the fact that the predetermined function may be seen as a cell adjacency metric taking into account the radio frequency signal levels with respect to plurality of cells at several locations in the network 100. E.g. by selecting such PCI mod 3 values which provide the smallest possible cumulated interference value in the network, the total amount of collisions may be reduced and the performance of the network 100 and the key performance indicators may be improved. It may also be noted that the PCI mod 3 of the cell affects the PSS of the cell. By allocating the PCI mod 3 values optimally, the collision of the PSSs may be reduced and the reference signal detection performance from the serving cells may be improved.

Let us now take a closer look at the possible options for the first function to be applied in the PCI mod 3 allocation procedure. For all the samples where cell i is the serving cell, at each sample k, the power level (e.g. the RSRP) from the serving cell is $S_i^{(k)}$, and the power level of the interfering cell j is $I_{i,j}^{(k)}$. The noise level is $\sigma_n^2$. In general, the PCI mod 3 values to be allocated are optimized by minimizing the following metric shown in Equation (1). That is, the first function may be expressed generally as follows:

$$\underset{c_p^{PSS}}{\text{minimize}}\ F\left(\begin{array}{c} S_1^{(1)},\ldots,S_1^{(N_{loc,1})},\ldots,S_{N_{cell}}^{(1)},\ldots,S_{N_{cell}}^{(N_{loc,N_{cell}})},g_{1,2}I_{1,2}^{(1)},\ldots, \\ g_{1,2}I_{1,2}^{(N_{loc,1})},\ldots,g_{N_{cell},N_{cell}-1}I_{N_{cell}N_{cell}-1}^{(1)},\ldots,g_{N_{cell},N_{cell}-1}I_{N_{cell}N_{cell}-1}^{(N_{loc,N_{cell}})} \end{array}\right) \quad (1)$$

such that $$g_{i,j} = \begin{cases} 1, & c_{p,i}^{PSS} = c_{p,j}^{PSS} \\ 0, & \text{otherwise} \end{cases}$$

$$c_{p,i}^{PSS} = \{0, 1, 2\};$$

$$c_{p,j}^{PSS} = \{0, 1, 2\}$$

where $N_{loc,i}$ is the number of samples where cell i is the serving cell, $c_p^{PSS}$ is the $p^{th}$ candidate solution which contains the candidate PCI mod 3 values for each of the plurality of cells. E.g. if there are nine cells, as shown in FIG. 1, then $c_p^{PSS}$ holds nine PCI mod 3 values. $c_{opt}^{PSS}$ is the optimized solution for the PCI mod 3 allocation. In the former example, $c_{opt}^{PSS}$ comprises also nine values, one for each cell.

The general form of the first function/equation may be offer several options for the to-be-applied first function. In an embodiment, the output of the first function represents a cumulative interference detection rate or value among the plurality of cells, wherein the first function takes into account the power levels of interference determined for each of the several locations $N_{loc}$ on the basis of the radio map 300. In other words, it may be said that in this case the first function depicts the cumulative inter-cell interference value or detection rate. An example option for the first equation which aims in minimizing the rate of inter-cell interference detection may be given as shown in Equation (2):

$$\underset{g_{i,j}}{\text{minimize}} \mu \sum_{i=1}^{N_{cell}} \sum_{j=1,j\neq i}^{N_{cell}} \sum_{k=1}^{N_{loc,i}} g_{i,j} \delta_{i,j}^{(k)} \quad (2)$$

such that $$\delta_{i,j}^{(k)} = \begin{cases} 1, & I_{i,j}^{(k)} > 0 \\ 0, & \text{otherwise} \end{cases}$$

where μ is a normalization constant so that the corresponding equation/function has a physical meaning. The normalization factor μ may be any value to aid the analysis. For example, for this Equation (2), when μ is 1, then the function (2) gives the average number of same PCI mod 3 interfering cells per location k. According to this Equation, at each location k, it is determined whether there is interference detected from another cell. The parameter g takes care that only cells having the same PCI mod 3 candidate are taken into account. That is interference from a cell with different PCI mod 3 is disregarded. This is because cells which are allocated another PCI mod 3 do not interfere each other's PSS transmissions. For example, looking at FIG. 3, assuming that the cells 102 and 106 have different PCI mod 3 value candidates and the cells 104 and 106 have the same PCI mod 3 value candidate according to the current tested combination, then the Equation (2) does not take the interference level 312 from the cell 102 into account, but only the interference level 314 coming from the cell 104.

It should be noted that instead of minimizing the rate of detection of the inter-cell interference, the object could be to minimize the amount of inter-cell interference detected. In such case, the actual power levels of inter-cell interference (as indicated with reference numeral 312 and 314 in FIG. 3) from those cells which have the same PCI mod 3 candidate number as the serving cell in the current combination may be accumulated together, for example. Then, it may be detected which combination provides the minimum value.

In another embodiment, the output of the first function represents a cumulative value related to a signal-to-interference (SIR) ratio or to a signal-to-interference-plus-noise (SINR) ratio, wherein the first function takes into account the corresponding ratios determined for each of the several locations $N_{loc}$ on the basis of the radio map 300. In these cases the corresponding first predetermined function may be given as shown with Equation (3) aiming at minimizing the average (reference signal) 1/SIR:

$$\underset{g_{i,j}}{\text{minimize}} \mu \sum_{i=1}^{N_{cell}} \sum_{j=1,j\neq i}^{N_{cell}} \sum_{k=1}^{N_{loc,i}} g_{i,j} I_{i,j}^{(k)} / S_i^{(k)} \quad (3)$$

and with Equation (4) aiming at maximizing the average (reference signal) SINR:

$$\underset{g_{i,j}}{\text{maximize}} \mu \sum_{i=1}^{N_{cell}} \sum_{k=1}^{N_{loc,i}} \frac{S_i^{(k)}}{\sum_{j=1,j\neq i}^{N_{cell}} g_{i,j} I_{i,j}^{(k)} + \sigma_n^2} \quad (4)$$

As shown, the SIR or SINR values may be obtained from the radio map 300 indicating the power levels of the desired signal, the power levels of interfering signals and the noise levels at each of the several locations $N_{loc}$ with respect to each cell. The applied RF signal levels of the radio map 300 may be based on the reference signals (RS/CRS).

In yet another embodiment, the output of the first function represents a cumulative throughput in the network 100, wherein the first function takes into account the throughputs determined for each of the several locations $N_{loc}$ on the basis of the radio map 300. In this embodiment, the first function/equation may be given as:

$$\underset{g_{i,j}}{\text{maximize}} \mu \sum_{i=1}^{N_{cell}} \sum_{k=1}^{N_{loc,i}} \beta\left(\frac{S_i^{(k)}}{\sum_{j=1,j\neq i}^{N_{cell}} g_{i,j} I_{i,j}^{(k)} + \sigma_n^2}\right) \quad (5)$$

where β(SINR) is the throughput of the UE as a function of the SINR.

It should be noted that other selections for the first function are possible as well, including maximizing the cell-edge throughput, minimizing detected amount of interference within a SIR threshold, minimizing the rate of detection of interference within the SIR threshold, etc. The threshold may be empirically derived or base on simulations. For example, in Equation (2), a threshold different than zero (0) could be used, in which case the interference is counted as detected only if the detected inter-cell interference from a certain cell exceeds a given non-zero threshold. The required parameters may be based on reference signal (RS) measurements or predictions, such as on RSRPs at several locations $N_{loc}$ in the network 100.

The interference levels, the SIR ratios, the SINR ratios, and/or the throughputs may be determined for each of the plurality cells in the network 100 at several locations of the network 100 on the basis of the radio map 300. It may be that the UE 308 has itself transmitted information indicating the needed parameters/parameter values (such as the detected interference for each cell) to the network element responsible of the PCI allocation so that the network element may build the map 300. Alternatively, the network element may have used simulation/prediction tools known to skilled person in order to acquire the radio map 300 comprising the needed parameters. Then, depending on the candidate $c_p^{PSS}$ the outcome of the selected first function may vary because the effect of inter-cell interference in the network is based on the allocation of the PCI mod 3 values. Finally, those PCI mod 3 values, which correspond to the output fulfilling the predefined criterion (i.e. minimize or maximize the first function), are selected and allocated to the plurality of cells of the network 100. Accordingly, the proposal may allow planning the PCIs to minimize CRC/PSS collisions.

Figure 5:
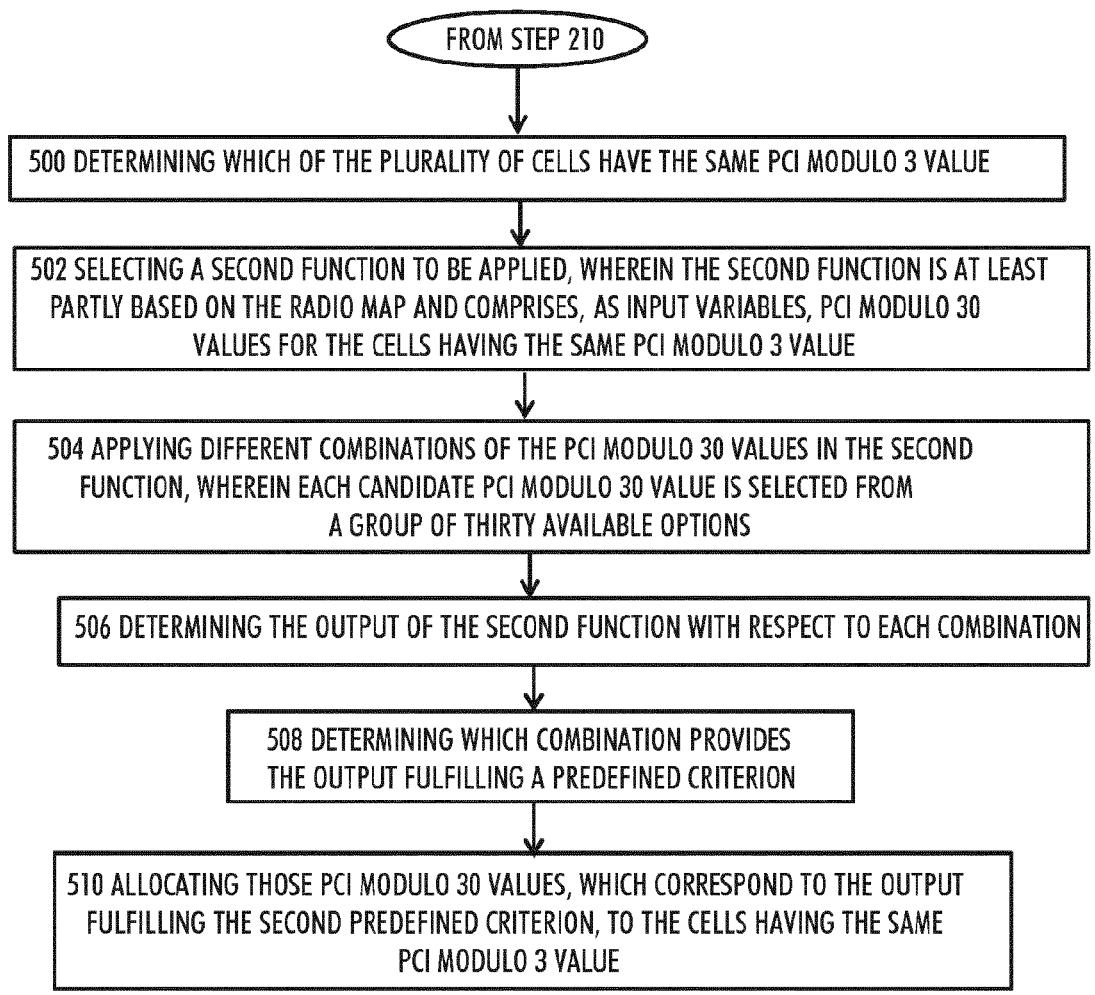
Figure 6:
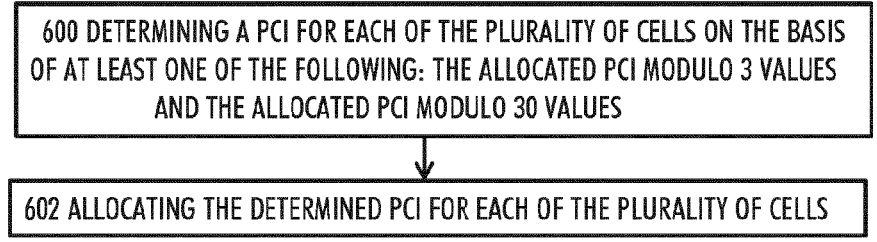

Now that the PCI mod 3 has been allocated optimally to the cells of the network 100, the PCI modulo 30 values may then be allocated, at least when the PUCCH DMRS collisions are to be avoided. For each PCI mod 3 grouping (group of cells with the same PCI mod 3 value), the PCI mod 30 values are allocated in a similar fashion as the PCI mod 3 values were allocated. E.g. by minimizing the average 1/(SIR), maximizing the average SINR, maximizing the average throughput or cell-edge throughput. This is shown in FIG. 5. After having allocated the PCI modulo 3 values for the plurality of cells in step 210, the network element responsible of PCI allocation may perform the steps 500 to 510.

In step 500 it is determined which of the plurality of cells have the same PCI modulo 3 value. If there are only three cells in the network, then each of them may have a different PCI mod 3 value. However, when there is more cells, then some of the cells are bound to have the same PCI mod 3 value. It may be important to be able to allocate PCI mod 30 values to those cells optimally, e.g. to allocate a different PCI mod 30 value to each of those cells having the same PCI mod 3 value. The available numbers for the PCI mod 30 range from 0 to 29. It should be noted that by allocating different PCI mod 3 values to some cells, then the PCI mod 30 is automatically different for those cell. Consequently, those cells need not be considered in the procedure of FIG. 5. However, it may be that the PCI mod 3 is the same for some cells. As the search space may be the same for many cells, then it may be important to optimally select which cells are allocated with which PCI mod 30 values. For example, neighboring cells may advantageously be assigned different PCI mod 30 values.

In step 502, the network element may select a second function to be applied, wherein the second function is at least partly based on the radio map 300 and comprises PCI mod 30 values for the cells having the same PCI mod 3 value as input variables. Thus, the second function may be similar as the first function. In an embodiment, the applied second function is the same as the applied first function.

The to-be-applied second function may be selected from the same group as the first function was selected. That is, it may represent the cumulative interference, the cumulative SIR or SINR, the cumulative throughput, the cumulative cell-edge throughput, the cumulative interference within a SIR threshold, the cumulative rate of detection of interference, etc. in the network 100 among the cells having the same PCI mod 3 values. In general, the second function may be given as:

$$\underset{c_p^{SSSGroup}}{\text{minimize}} F\left( \begin{array}{c} S_1^{(1)}, \ldots, S_1^{(N_{loc,1})}, \ldots, S_{N_{cell}}^{(1)}, \ldots, S_{N_{cell}}^{(N_{loc,N_{cell}})}, g_{1,2} I_{1,2}^{(1)}, \ldots, \\ g_{1,2} I_{1,2}^{(N_{loc,1})}, \ldots, g_{N_{cell},N_{cell}-1} I_{N_{cell} N_{cell}-1}^{(1)}, \ldots, g_{N_{cell},N_{cell}-1} I_{N_{cell} N_{cell}-1}^{(N_{loc,N_{cell}})} \end{array} \right) \quad (6)$$

such that $$g_{i,j} = \begin{cases} 1, & c_{p,i}^{SSSGroup} = c_{p,j}^{SSSGroup} \\ 0, & \text{otherwise} \end{cases}$$

$$c_{p,i}^{SSSGroup} = \{0, 1, \ldots, 29\}, c_{p,i}^{SSSGroup} \bmod 3 = c_{opt,i}^{PSS}$$

$$c_{p,j}^{SSSGroup} = \{0, 1, \ldots, 29\}, c_{p,j}^{SSSGroup} \bmod 3 = c_{opt,j}^{PSS}$$

where $C_p^{SSSGroup}$ is the $p^{th}$ candidate solution which contains the candidate PCI mod 30 values for all the cells having the same PCI mod 3 value. A parameter $c_{opt}^{SSSGroup}$ is the optimized solution for PCI mod 30 allocation for these cells. In Equation (6), the cells are assumed to run from 1 to $N_{cell}$ even though some cells may be bypassed depending on what the earlier allocated PCI mod 3 of the cell is. For example, when performing the PCI mod 30 allocation for the cells having PCI mod 3=0, then all the cells which have been allocated with PCI mod 3=1 or with PCI mod 3=2 may be bypassed and/or disregarded.

In step 504, the network element may apply different combinations of the PCI mod 30 values in/to the second function, wherein each candidate PCI mod 30 value is selected from a group of thirty available options, such as from {0, 1, 2, . . . , 29}. However, in an embodiment this group may be narrowed down from thirty by requiring that each candidate PCI modulo 30 value for a certain cell i fulfills a following condition: a modulo 3 arithmetic performed for the candidate PCI modulo 30 value is the same as previously (in step 210) allocated PCI modulo 3 value for the same certain cell i. That is, by forcing the candidate values to fulfill the criterion according to which $c_{p,i}^{SSSGroup}$ mod 3=$c_{opt,i}^{PSS}$. This is because if the PCI mod 3 for the cell i is determined to be 1, then a PCI mod 30 value of 6, for example, cannot be allocated to the cell i as such allocation would not fulfill the PCI mod 3=1 allocation.

For example, let us assume that for cells i and j the PCI mod 3 is 1 (i.e. $c_{opt,i}^{PSS}$=$c_{opt,j}^{PSS}$=1). In such case, the possible PCI values fulfilling the PCI mod 3 criterion are {1, 4, 7, . . . , 31, 34, . . . , 163, 166, . . . , 499, 502}. Remember that possible PCI values may range in the LTE from 0 to 503, as explained above. Now instead of pursuing the whole range {0, 1, . . . , 29}, this range may be narrowed down. When modulo 30 arithmetic is applied to these possible PCI values, the following numbers are obtained: {1, 4, 7, 10, 13, 16, 19, 22, 25, 28}. In other words, if the PCI mod 3 already dictates that the PCI may not be, for example, 2 or 3, then such PCI mod 30 values need not be considered. Thus, the values {1, 4, 7, 10, 13, 16, 19, 22, 25, 28} may be the search space for the PCI mod 30 values (i.e. the available candidate PCI mod 30 values) for the cells i and j.

In step 506, the output of the second function with respect to each combination may be determined. As was the case for the first function, in an embodiment, the second function may disregard the inter-cell interference caused to a first cell by a second cell when the first cell and the second cell have different candidate PCI mod 30 values according to the current combination. This may be because when the cells have different PCI mod 30 values, they also have different PUCCH DMRS sequences. Having different PCI mod 30 may advantageously lead to the use of different DMRSs and decrease of DMRS collisions. Accordingly, the embodiment may allow planning the PCIs to minimize PUCCH DMRS collisions.

In step 508 it may be determined which combination provides the output fulfilling a second predefined criterion. The second predefined criterion may in an embodiment comprise minimizing or maximizing the output of second function. Finally, in step 510, the network element may allocate those PCI mod 30 values, which correspond to the output fulfilling the second predefined criterion, to the cells having the same PCI mod 3 value. This may be done to reduce the interference between the PUCCH DMRSs of the cells. The determined optimized PCI mod 30 value for a cell j may indicate a group of allowable PCI values for the cell j. For example, if the selected PCI mod 30 for cell j is determined to be 10 (i.e. $c_{opt,j}^{SSSGroup}=10$), then the PCI to be allocated to the cell j needs to be selected from a group of {10, 40, 70, 100, ..., 470, 500}. These values also imply that the allocated PCI mod 3 value for the cell j is 1, (i.e. $c_{opt,i}^{PSS}=1$).

Now that the PCI mod 3 values (i.e. the $N_{ID2}$) and the PCI mod 30 values have been allocated to each cell in an optimal manner, the network element may in step 600 determine the PCI for each of the plurality of cells on the basis of the allocated PCI modulo 3 values/numbers and the allocated PCI modulo 30 values/numbers, and finally, in step 602, allocate the determined PCIs for each of the plurality of cells of the network 100.

Accordingly, the PCIs from a group {0, 1, 2, ..., 502} may be arbitrarily selected as long as the allocation fulfils the following criteria:

Modulo 30 arithmetic of the assigned PCI for cell i must be the same as the previously (in step 510) allocated PCI mod 30 value, i.e. $PCI_i \bmod 30 = c_{opt,i}^{PSSGroup}$. This is reasonable so that the allocations performed in steps 210 and 510 of FIGS. 2 and 5 are used as a basis for the final PCI allocation and are not overruled. It should be noted that this requirement/condition/constraint holds when the PCI mod 30 values are allocated according to FIG. 5 to the cells of the network 100.

Neighbour cells and neighbour-of-neighbour cells must not have the same PCI in order to avoid confusion during handovers. Thus, these neighbour and neighbour-of-neighbor cells are advantageously allocated different PCIs. In an embodiment, a neighbour cell is a cell that is registered in an eNB, which may be the source or target of a handover. This may be put in an Equation as $$v_{i,j} = \begin{cases} 1, & \text{site } i \text{ and } j \text{ are neighbors} \\ 0, & \text{otherwise} \end{cases} \quad (7)$$

$$w_{i,j} = \begin{cases} 1, & \text{site } i \text{ and } j \text{ are neighbor-of-neighbors} \\ 0, & \text{otherwise} \end{cases} \quad (8)$$

Further, as optional requirement, there may be defined some blacklisted PCI which are not used for selection. These blacklisted PCIs may be PCIs that are known to result in inefficient throughput or increase of interference, for example.

As another optional constraint, there may be requirement that minimum site-to-site distance thresholds are followed. Such site-to-site distance may imply the physical distance between the transmission points, regardless of whether or not their coverage areas overlap. This means that if the distance between cells i and j is large enough (threshold may be based on empirical derivation or simulations, for example), the cells i and j may be allocated the same PCI. If the distance is less than the threshold, the cells i and j should be allocated with different PCIs. In the form of Equation this may be given as:

$$d_{i,j} = \begin{cases} 1, & dist_{i,j}^{site-to-site} \leq dist_{threshold}^{site-to-site} \\ 0, & \text{otherwise} \end{cases} \quad (9)$$

As a further optional requirement, cells of the same site m (such as of the same eNB) must have the same value of $PCI_m/3$. This may be especially useful for sites with three sectors/cells. In other words, these cells are forced to have the same SSS sequence, i.e. the same $N_{ID1}$. Then, the three cells of the same site 102 may each have different PSS (i.e. the $N_{ID2}$ of each of the three sectors is different).

The allocation of the final physical layer cell identities (PCIs) to the cell may, based on the above, be given as a minimization problem according to the Equation (10) below:

$$\underset{PCI_i}{\text{minimize}} \sum_{i=1}^{N_{cell}} \sum_{j=1, j \neq i}^{N_{cell}} q_i F(S_i, I_{i,j}, d_{i,j} v_{i,j}, w_{i,j}) \quad (10)$$

such that $$q_i = \begin{cases} 1, & PCI_i = PCI_j \\ 0, & \text{otherwise} \end{cases}$$

Figure 7:
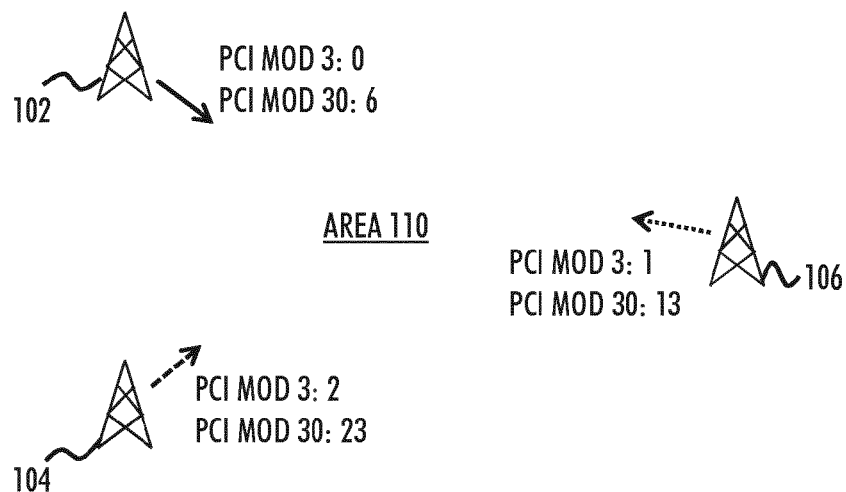
FIG. 7 shows an embodiment related to allocation of physical cell identities to several cells, according to an embodiment.

By solving this minimization problem, the PCIs for the cells of the network 100 may be obtained. Consequently, the proposal may allow optimizing the PCIs to minimize CRC/PSS/PUCCH DMRS collisions. For example, as shown in FIG. 7, at least three cells from different eNBs 102, 104, 106 may overlap in the area 110. According to the optimized PCI planning, the overlapping cells may be allocated with different PCI mod 3 values and different PCI mod 30 values, as shown. Note that the given example values are simply for illustrative purposes.

The given minimization/maximization problems of some of the embodiments may be non-deterministic polynomial-time (NP)—hard. Therefore, the method of global search for the solution may be selected from the available options known to a skilled person. Some examples of such available options comprise simulated annealing, tabu-search, genetic and evolutionary algorithms, for example.

As explained above, the proposal may result in the allocation of the PCIs to the cells. This may be performed in a three-step procedure. In the step 1, the allocation of the PCI mod 3 may be made for example according to FIG. 2 in order to minimize CRS and PSS interferences. In step 2, the allocation of the PCI mod 30 based on PCI mod 3 grouping is made for example according to FIG. 5 in order to minimize DMRS interferences. Finally, in step 3 the PCIs are allocated based on the PCI mod 30 and/or PCI mod 3 allocations for example in order to avoid the neighbors and neighbors-of-neighbors to have the same PCIs. This may enable a provider of a network, such as an operator, to provide an efficient and a customer-friendly communication network to the end-users.

Figure 8:
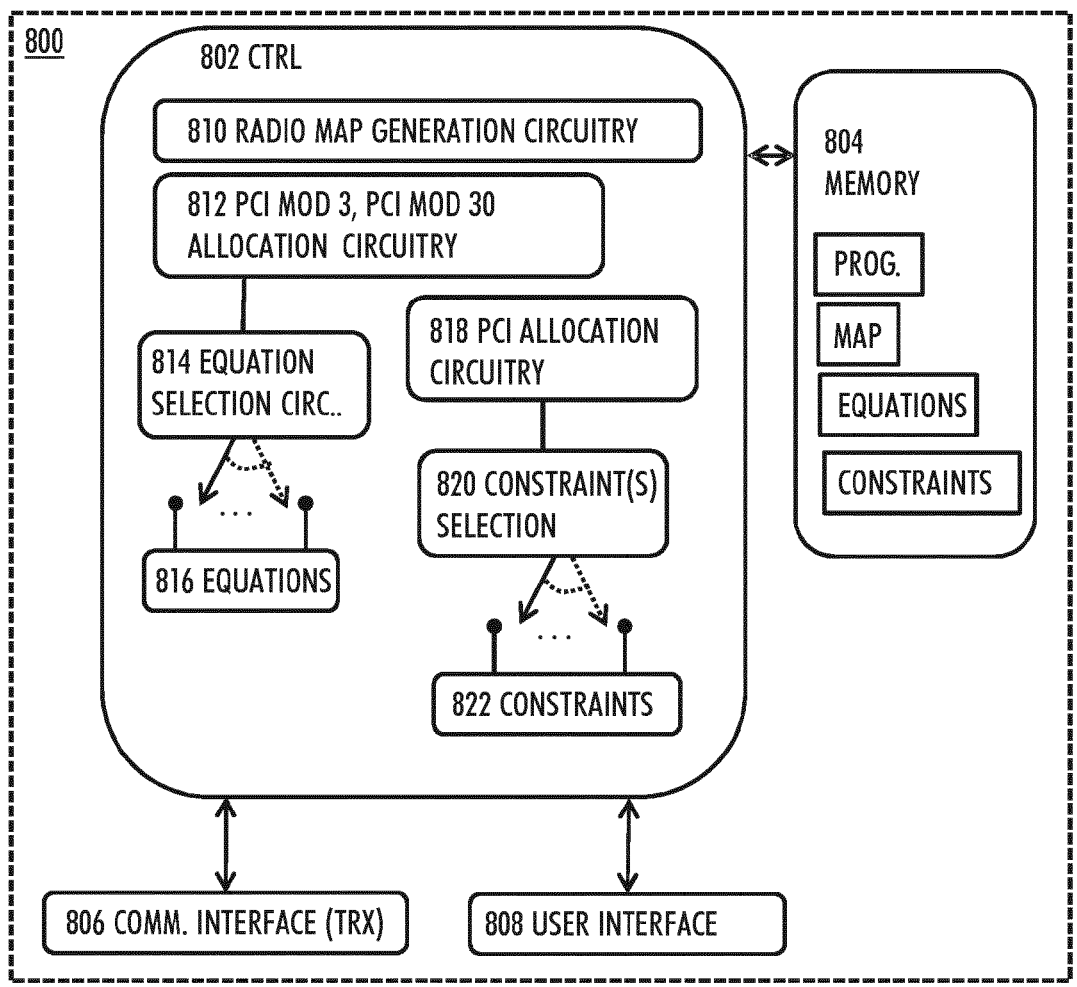
FIG. 8 illustrates an apparatus, according to an embodiment.

An embodiment, as shown in FIG. 8, provides an apparatus 800 comprising a control circuitry (CTRL) 802, such as at least one processor, and at least one memory 804 including a computer program code (PROG), wherein the at least one memory 804 and the computer program code (PROG), are configured, with the at least one processor 802 to cause the apparatus 800 to carry out any one of the embodiments. The memory 804 may be implemented using any suitable data storage technology, such as semiconductor based memory devices, flash memory, magnetic memory devices and systems, optical memory devices and systems, fixed memory and removable memory.

The apparatus 800 may be any entity or logical element in the network 100 responsible of performing the PCI planning and allocations to the network 100. For example, the apparatus 800 may be a part of the EPC of the LTE or the LTE-A.

The control circuitry 802 may comprise a radio map generation circuitry 810 for generating the radio map 300, according to any of the embodiments. The apparatus 800 may store the map in the memory 804, for example.

The control circuitry 802 may further comprise a PCI mod 3 and a PCI mod 30 allocation circuitry or module 812 for the allocation of the PCI mod 3 values and the PCI mod 30 values, according to any of the embodiments. The circuitry 812 may communicate with an equation selection circuitry 814 for selecting the first and the second functions to be applied in the allocation processes according to FIGS. 2 and 5, for example. The control circuitry 802 may thus comprise information of the equations/functions 816. The apparatus 800 may, for example, store the equations/functions in the memory 804.

The control circuitry 802 may further comprise PCI allocation circuitry 818 for allocating the PCI, according to any of the embodiments. The circuitry 818 may communicate with a constraints/condition selection circuitry 820 which may be responsible of selecting constraints/conditions 822 applied in the PCI allocation. The constraints 822 may be stored in the memory 804, for example. Possible constraint may include the distance thresholds, blacklisted PCIs, same SSS requirement for three-sector sited, etc.

The apparatus 800 may further comprise a communication interface (TRX) 806 comprising hardware and/or software for realizing communication connectivity according to one or more communication protocols. The TRX 806 may provide the apparatus with communication capabilities to access the radio access network, for example.

The apparatus 800 may also comprise a user interface 808 comprising, for example, at least one keypad, a microphone, a touch display, a display, a speaker, etc. The user interface 808 may be used to control the apparatus 800 by the user.

As used in this application, the term 'circuitry' refers to all of the following: (a) hardware-only circuit implementations, such as implementations in only analog and/or digital circuitry, and (b) combinations of circuits and software (and/or firmware), such as (as applicable): (i) a combination of processor(s) or (ii) portions of processor(s)/software including digital signal processor(s), software, and memory(ies) that work together to cause an apparatus to perform various functions, and (c) circuits, such as a microprocessor(s) or a portion of a microprocessor(s), that require software or firmware for operation, even if the software or firmware is not physically present. This definition of 'circuitry' applies to all uses of this term in this application. As a further example, as used in this application, the term 'circuitry' would also cover an implementation of merely a processor (or multiple processors) or a portion of a processor and its (or their) accompanying software and/or firmware. The term 'circuitry' would also cover, for example and if applicable to the particular element, a baseband integrated circuit or applications processor integrated circuit for a mobile phone or a similar integrated circuit in a server, a cellular network device, or another network device.

The techniques and methods described herein may be implemented by various means. For example, these techniques may be implemented in hardware (one or more devices), firmware (one or more devices), software (one or more modules), or combinations thereof. For a hardware implementation, the apparatus(es) of embodiments may be implemented within one or more application-specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof. For firmware or software, the implementation can be carried out through modules of at least one chip set (e.g. procedures, functions, and so on) that perform the functions described herein. The software codes may be stored in a memory unit and executed by processors. The memory unit may be implemented within the processor or externally to the processor. In the latter case, it can be communicatively coupled to the processor via various means, as is known in the art. Additionally, the components of the systems described herein may be rearranged and/or complemented by additional components in order to facilitate the achievements of the various aspects, etc., described with regard thereto, and they are not limited to the precise configurations set forth in the given figures, as will be appreciated by one skilled in the art.

Embodiments as described may also be carried out in the form of a computer process defined by a computer program. The computer program may be in source code form, object code form, or in some intermediate form, and it may be stored in some sort of carrier, which may be any entity or device capable of carrying the program. For example, the computer program may be stored on a computer program distribution medium readable by a computer or a processor. The computer program medium may be, for example but not limited to, a record medium, computer memory, read-only memory, electrical carrier signal, telecommunications signal, and software distribution package, for example. Coding of software for carrying out the embodiments as shown and described is well within the scope of a person of ordinary skill in the art.

Even though the invention has been described above with reference to an example according to the accompanying drawings, it is clear that the invention is not restricted thereto but can be modified in several ways within the scope of the appended claims. Therefore, all words and expressions should be interpreted broadly and they are intended to illustrate, not to restrict, the embodiment. It will be obvious to a person skilled in the art that, as technology advances, the inventive concept can be implemented in various ways. Further, it is clear to a person skilled in the art that the described embodiments may, but are not required to, be combined with other embodiments in various ways.

The invention claimed is:

1. A method, comprising:
generating, by a network element, a radio map of a single-frequency network having a plurality of cells, wherein the radio map represents power levels of radio signals at several locations in the network;

selecting a first function to be applied, wherein the first function is at least partly based on the radio map and comprises physical cell identity, PCI, modulo 3 values for the plurality of cells as input variables;

applying different combinations of the PCI modulo 3 values in the first function, wherein each candidate PCI modulo 3 value is selected from a group of three available options;

determining the output of the first function with respect to each combination;

determining which combination provides the output fulfilling a predefined criterion; and allocating those PCI modulo 3 values, which correspond to the output fulfilling the predefined criterion, to the plurality of cells in order to reduce the interference between primary synchronization sequences.

2. The method of claim 1, wherein the radio map represents at least one of the following for each of the several locations: the power level of the radio signal with respect to the serving cell, the power level of interference, noise level.

3. The method of claim 1, further comprising:
receiving radio map related parameters from a user equipment, wherein the radio map related parameters are based on radio signal measurements performed by the user equipment; and
generating the radio map on the basis of the received parameters.

4. The method of claim 1, further comprising: estimating radio map related parameters on the basis of mathematical simulations; and generating the radio map on the basis of the estimated parameters.

5. The method of claim 1, wherein the first function disregards the interference caused to a first cell by a second cell when the first cell and the second cell have different PCI modulo 3 values according to the current combination.

6. The method of claim 1, wherein the output of the first function represents a cumulative interference detection rate or a cumulative interference value among the plurality of cells, wherein the first function takes into account the power levels of interference determined for each of the several locations on the basis of the radio map.

7. The method of claim 1, wherein the output of the first function represents a cumulative value related to a signal-to-interference ratio or to a signal-to-interference-plus-noise ratio, wherein the first function takes into account the corresponding ratios determined for each of the several locations on the basis of the radio map.

8. The method of claim 1, wherein the output of the first function represents a cumulative throughput in the network, wherein the first function takes into account the throughputs determined for each of the several locations on the basis of the radio map.

9. The method of claim 8, further comprising:
after having allocated the PCI modulo 3 values for the plurality of cells, performing the following:
determining which of the plurality of cells have the same PCI modulo 3 value;
selecting a second function to be applied, wherein the second function is at least partly based on the radio map and comprises, as input variables, PCI modulo 30 values for the cells having the same PCI modulo 3 value;

applying different combinations of the PCI modulo 30 values in the second function, wherein each candidate PCI modulo 30 value is selected from a group of at thirty available options;

determining the output of the second function with respect to each combination;

determining which combination provides the output fulfilling a second predefined criterion; and allocating those PCI modulo 30 values, which correspond to the output fulfilling the second predefined criterion, to the cells having the same PCI modulo 3 value in order to reduce the interference between different demodulation reference signals.

10. The method of claim 9, further comprising:
narrowing the number of available options for the candidate PCI modulo 30 values by requiring that each candidate PCI modulo 30 value for a certain cell fulfills a following condition: a modulo 3 arithmetic performed for the candidate PCI modulo 30 value is the same as the allocated PCI modulo 3 value for the certain cell.

11. The method of claim 9, wherein the second function disregards the interference caused to a first cell by a second cell when the first cell and the second cell have different PCI modulo 30 values according to the current combination.

12. The method of claim 9, wherein the second function is the same as the first function.

13. The method of claim 1, further comprising:
determining a PCI for each of the plurality of cells on the basis of at least one of the following: the allocated PCI modulo 3 values and the allocated PCI modulo 30 values; and
allocating the determined PCI for each of the plurality of cells.

14. An apparatus, comprising:
at least one processor and at least one memory including a computer program code, wherein the at least one memory and the computer program code are configured, with the at least one processor, to cause the apparatus at least to:
generate a radio map of a single-frequency network having a plurality of cells, wherein the radio map represents power levels of radio signals at several locations in the network;
select a first function to be applied, wherein the first function is at least partly based on the radio map and comprises physical cell identity, PCI, modulo 3 values for the plurality of cells as input variables;
apply different combinations of the PCI modulo 3 values in the first function, wherein each candidate PCI modulo 3 value is selected from a group of three available options;
determine the output of the first function with respect to each combination;
determine which combination provides the output fulfilling a predefined criterion; and
allocate those PCI modulo 3 values, which correspond to the output fulfilling the predefined criterion, to the plurality of cells in order to reduce the interference between primary synchronization sequences.

15. The apparatus of claim 14, wherein the radio map represents at least one of the following for each of the several locations: the power level of the radio signal with respect to the serving cell, the power level of interference, noise level.

16. The apparatus of claim 14, wherein the at least one memory and the computer program code are configured, with the at least one processor, to cause the apparatus further to:

receive radio map related parameters from a user equipment, wherein the radio map related parameters are based on radio signal measurements performed by the user equipment; and generate the radio map on the basis of the received parameters.

17. The apparatus of claim 14, wherein the at least one memory and the computer program code are configured, with the at least one processor, to cause the apparatus further to:

estimate radio map related parameters on the basis of mathematical simulations; and generate the radio map on the basis of the estimated parameters.

18. The apparatus of claim 14, wherein the first function disregards the interference caused to a first cell by a second cell when the first cell and the second cell have different PCI modulo 3 values according to the current combination.

19. The apparatus of claim 14, wherein the output of the first function represents a cumulative interference detection rate or a cumulative interference value among the plurality of cells, wherein the first function takes into account the power levels of interference determined for each of the several locations on the basis of the radio map.

20. The apparatus of claim 14, wherein the output of the first function represents a cumulative value related to a signal-to-interference ratio or to a signal-to-interference-plus-noise ratio, wherein the first function takes into account the corresponding ratios determined for each of the several locations on the basis of the radio map.

21. The apparatus of claim 14, wherein the output of the first function represents a cumulative throughput in the network, wherein the first function takes into account the throughputs determined for each of the several locations on the basis of the radio map.

22. The apparatus of claim 14, wherein the at least one memory and the computer program code are configured, with the at least one processor, to cause the apparatus further to:

after having allocated the PCI modulo 3 values for the plurality of cells, performing the following:

determine which of the plurality of cells have the same PCI modulo 3 value; select a second function to be applied, wherein the second function is at least partly based on the radio map and comprises, as input variables, PCI modulo 30 values for the cells having the same PCI modulo 3 value;

apply different combinations of the PCI modulo 30 values in the second function, wherein each candidate PCI modulo 30 value is selected from a group of at thirty available options;

determine the output of the second function with respect to each combination;

determine which combination provides the output fulfilling a second predefined criterion; and allocate those PCI modulo 30 values, which correspond to the output fulfilling the second predefined criterion, to the cells having the same PCI modulo 3 value in order to reduce the interference between different demodulation reference signals.

23. The apparatus of claim 22, wherein the at least one memory and the computer program code are configured, with the at least one processor, to cause the apparatus further to:

narrow the number of available options for the candidate PCI modulo 30 values by requiring that each candidate PCI modulo 30 value for a certain cell fulfills a following condition: a modulo 3 arithmetic performed for the candidate PCI modulo 30 value is the same as the allocated PCI modulo 3 value for the certain cell.

24. The apparatus of claim 22, wherein the second function disregards the interference caused to a first cell by a second cell when the first cell and the second cell have different PCI modulo 30 values according to the current combination.

25. The apparatus of claim 22, wherein the second function is the same as the first function.

26. The apparatus of claim 14, wherein the at least one memory and the computer program code are configured, with the at least one processor, to cause the apparatus further to:

determine a PCI for each of the plurality of cells on the basis of at least one of the following: the allocated PCI modulo 3 values and the allocated PCI modulo 30 values; and allocate the determined PCI for each of the plurality of cells.

27. A computer program product embodied on a distribution medium readable by a computer and comprising program instructions which, when loaded into an apparatus, execute the method according to claim 1.

\* \* \* \* \*